July 2, 1963     D. D. KINSWORTHY     3,096,468
CONTROL SYSTEM FOR PLURAL SPEED FAN MOTORS
Filed Jan. 18, 1960
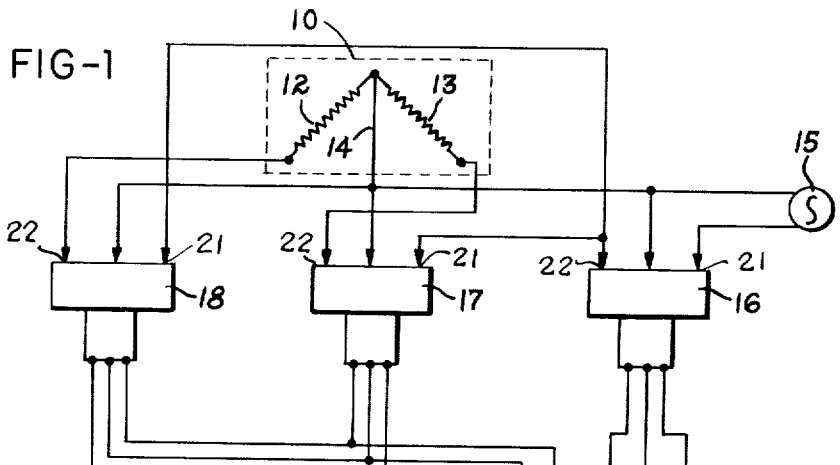
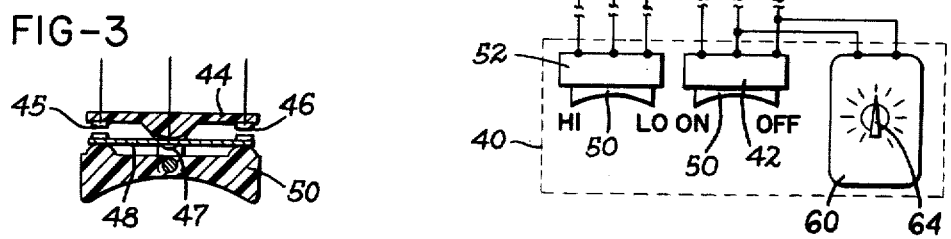
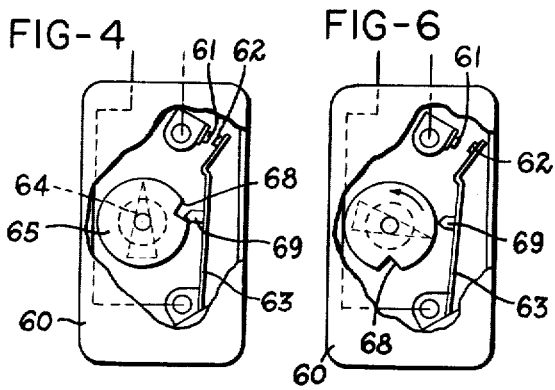
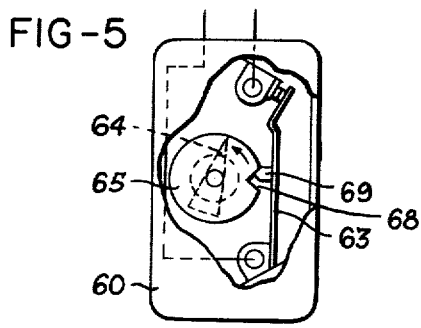
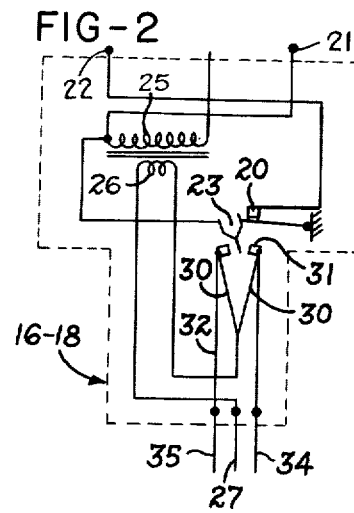
*INVENTOR.*
DONALD D. KINSWORTHY
BY
ATTORNEYS

United States Patent Office 3,096,468
Patented July 2, 1963

3,096,468
CONTROL SYSTEM FOR PLURAL SPEED
FAN MOTORS
Donald D. Kinsworthy, Dayton, Ohio, assignor to The
Lau Blower Company, Dayton, Ohio, a corporation of
Ohio
Filed Jan. 18, 1960, Ser. No. 2,925
5 Claims. (Cl. 318—224)

This invention pertains to air conditioning systems and more particularly to a system for the remote control of fans such as used for attic exhaust fan motors.

It is a primary object of the invention to provide a remote control system for exhaust fans and the like which will have the advantage of simplified installation into new and existing structures, such as houses, factories, and the like without the necessity of running long high currents, high voltage fan conduits.

The invention utilizes a relay system for supplying line voltage directly to the inputs of an electric fan by a low voltage remote control. The relays are preferably of the thermal wire actuated type including a step-down transformer and a pair of thermal release wires associated with electric inputs which are selectively energizable to effect the movement of an over-center mechanism within the relay between off and on positions. The control relays are operated from a remote location, such as a unitary control panel, through low voltage wiring, and such panel is readily arranged to control a fan as to speed and time as well as on-off. The invention also provides versatility in the location of the control panel due to the necessity for running only low cost-low voltage control wires from the relays to the panel, thus providing simplified installation with low installation cost. Also, the system lends itself to the use of additional control panels for multi-position control.

It is therefore an object of this invention to provide an exhaust fan control system as outlined above using low voltage relays for the integrated speed and timed operation of a blower from a remote position.

A further object of the invention is to provide a system for the remote low voltage control of a fan from a unitary panel through thermal relays.

Another object of this invention is to provide an exhaust fan control system as outlined above characterized by an adaptability to a wide variety of installation requirements with a minimum of cost and modification to existing structures.

Other objects and advantages of the invention will be apparent from the following description, the accompanying drawing and the appended claims.

In the drawing—

FIG. 1 is an electrical wiring diagram of the system of this invention;

FIG. 2 is a schematic diagram of one of the thermal relays;

FIG. 3 is a sectional view through one of the rocker switches; and

FIGS. 4–6 are somewhat diagrammatic sequence views of the timer mechanism.

Referring to the drawing, which illustrates a preferred embodiment of this invention, an exhaust fan motor is indicated electrically at 10 in FIG. 1 as including a high speed winding 12 and a low speed winding 13 connected by a common lead 14. The exhaust fan motor 10 may be of any suitable conventional type adapted for installation, for instance, in the attic of a home. The motor 10 is arranged to operate from a suitable source of electrical energy, such as the alternating current source indicated at 15, which may be conveniently accessible at site of the fan installation.

The application of power from the source 15 to the motor 10 is effected and controlled by thermal relays indicated at 16—18. The relays 16—18 are preferably located in close proximity to the fan motor and generally remote from a convenient control location in order to shorten the high voltage, high current leads between the source 15 and the motor 10. One of these relays 16—18 is schematically illustrated in FIG. 2 as including single pole, single throw power contacts 20 which may be operated by the relay mechanism to make and break an electric circuit between a load inlet lead 21 and an outlet lead 22.

The contacts 20 of the thermal relay are arranged to be opened and closed by an over-center trip mechanism indicated generally at 23. A low voltage thermal actuator for operating the trip mechanism 23 includes a step-down transformer 25 arranged for operation from the source 15. The secondary winding 26 of the transformer 25 has one tap which forms a "hot" control lead 27. The other tap is electrically connected to a pair of spring arms 30 having operating pads 31 mounted on the extended ends thereof for engagement with the trip mechanism 23. Each of the spring arms 30 is biased into a normally retracted position by a fine thermal wire 32 under tension. The wires 32 each have one end electrically connected to the transformer 25 through the arms 30 and are extended to form low voltage "on" and "off" control inputs 34 and 35 into the relay. The inputs 34 and 35, when momentarily connected to the hot lead 27 by a remote switch, cause an expansion of the associated thermal wire 32 resulting in the release of the associated spring arm 30 to effect over-center tripping of the mechanism 23 either to open or close the relay contacts 20.

As shown in FIG. 1, the relay 16 comprises first thermal relay means having one load lead 21 connected to the source of power 15 and the other load lead 22 is connected to apply this power to second thermal relay means consisting of the relays 17 and 18. The load lead 22 of the relay 17 is connected to energize low speed winding 13 through the common lead 14, and the load lead 22 of the relay 18 is similarly connected to energize the high speed winding 12.

Integrated remote control and automatic shut-off means for controlling the motor 10 through thermal relays 16—18 includes a control panel 40. The panel 40 may be placed in any convenient and accessible location since its location is not dictated by any consideration of the routing or installation of high voltage or high current conduits, as the control is effected by means of the low voltage inputs 34 and 35 through light weight interconnecting leads.

The control panel 40 includes a first single pole, double throw, normally open rocker switch 42 which is connected to the low voltage inputs 34 and 35, and the "hot" lead 27 of the relays 16. The arrangement of the switch 42 provides for the selective energization of the thermal wires 32 to apply and remove the source 15 upon the momentary closing thereof. A physical arrangement of the switch 42 may be seen in FIG. 3 as including a fixed body 44 of suitable dielectric material having a pair of spaced selectable contacts 45 and 46 and a center common contact 47 on a contact spring 48. An electric circuit path may be effected between the center contact 47 and either of the contacts 45 and 46 by means of a finger operated rocker 50 pivoted on the body 44 adjacent the contact 47. The rocker 50 is operable to depress either end of the contact spring 48 into electrical engagement with the contacts 45 and 46 at either end thereof.

Selection of either high or low speed operation is effected through a second single pole, double throw, normally open rocker switch 52, similar to the switch 42. The switch 52 is similarly connected to the low voltage inputs of the relays 17 and 18, it being understood that the operative relay inputs 34 and 35 of the relay 17 are connected in reversed sense to those of the relay 18. The momentary closing of one of the contacts within the rocker switch 52, effected by pressing its operating rocker 50 at the appropriate end, effects simultaneous closing of one of the relays 17, 18 and the opening of the other to complete a closed circuit from the relay 16 to the appropriate one of the motor windings 12 or 13.

In many installations it is desired to provide a timer by means of which the operation of the motor 10 may be stopped after a preset time interval, such as during the evening or early morning hours when cooling is no longer desired. Accordingly, the panel 40 incorporates a timer 60 for this purpose which includes a normally fixed contact 61 and a movable contact 62 on an arm 63. The contacts 61 and 62 are electrically connected with the inputs 27 and 34 of the relay 16 to energize the "off" input of the relay 16 upon the conclusion of a preset time period.

The mechanical operating mechanism within the timer 60 may consist of the usual escapement mechanism which is set or wound by the clockwise rotation of a handle or pointer 64. When released, the pointer 64 returns at a controlled rate to its at-rest, or zero position, shown in FIG. 4. A contact actuating cam 65 is incorporated within the timer 60 and is arranged to rotate through the escapement mechanism with the pointer 64 and is formed with a notch or cut-out portion 68. The notch 68 cooperates with a follower 69 of the contact arm 63 to close the contacts 61 and 62 as shown in FIG. 5 during the return movement from the wound position shown in FIG. 6 to the at-rest position shown in FIG. 4. The closing of the contacts 61 and 62 applies a signal to the low voltage input leads 27 and 34 substantially at the conclusion of the preset time period which results in the opening of the circuit between the source 15 and the relays 17 and 18 thus stopping the fan.

The operation of this invention is largely self-evident from the foregoing description. A momentary depression of the "on" side of the rocker switch 42 is all that is necessary to start the exhaust fan motor 10 through either one of the relays 17 or 18. The operation of the fan may be transferred from high speed to low speed or vice versa by the momentary depression of the appropriate side of the rocker switch 52. Timed operation may be effected by appropriately setting the pointer 64 of the timer 60, as desired, to close its internal contacts upon the expiration of the preset time period, thereby breaking the circuit through the relay 16.

It is seen that the control panel 40 may be advantageously located, as desired, without the necessity of installing high voltage conductors from the fan to the panel 40. Additional panels 40 may be provided, as desired, by wiring in parallel to the panel 40 shown, requiring only the running of additional low voltage leads. It will be noted that the use of "three way" switches is obviated. The system of the invention is particularly adapted for installation of exhaust fans within existing structures with a minimum of alteration to the structure and with a maximum of versatility.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An integrated remote control and automatic shut-off system for an attic fan motor having high and low speed windings, comprising first thermal relay means having on and off low voltage control inputs and adapted for connection to a source of fan motor power, second thermal relay means connected to receive motor power from said source through said first thermal relay means and having selectable low voltage inputs adapted to apply said power selectively to said high and low speed windings upon the momentary energization thereof, an integrated remote low voltage control panel including a first single pole double throw normally open rocker switch connected to the inputs of said first relay means for applying and removing motor power from said source to said second relay means upon the momentary closing thereof, a second single pole double throw normally open rocker switch connected to the inputs of said second relay means for causing said power to be applied to said fan motor selectively through said high and low speed windings upon the momentary closing thereof, and a fan timer in said panel having a normally open contact arranged to close momentarily to energize said off input of said first relay means upon the conclusion of a preset period of time to remove said source from said fan motor.

2. A remote speed control system for a fan motor having selectable high and low speed windings, comprising a pair of thermal relays each having a high voltage lead connected to a source of motor power and each having closable high voltage contacts connected to apply said motor power to a selected one of said windings, each of said thermal relays having a pair of selectable inputs operable, when energized, to effect the selection between the opening and closing of the associated said contacts, means connecting said inputs in parallel reversed relation so that the energization of one of said inputs results in the closing of the contacts in one of said relays and the opening of the contact in the other, and a common speed selector switch for said relays connected to said parallel connected inputs for effecting the selective energization thereof.

3. A remote control system for a fan motor having individual selectable high and low speed windings, comprising a first thermal relay having a high voltage lead connected to a source of power and a pair of low voltage input leads operable selectively to open and close said relay, speed control means including a pair of said thermal relays each having a high voltage lead connected to receive motor power through said first relay and each having closable high voltage contacts connected to apply said motor power to a selected one of said motor windings, each of said pair of relays having a pair of selectable low voltage control inputs, means connecting the inputs of each of said pair of thermal relays in parallel reversed relation so that the energization of either one of said inputs results in the making of the contacts in one relay of said pair of relays and the breaking of the contacts in the other relay of said pair, and a common speed control switch connected for effecting selective energization of said parallel connected inputs.

4. A low voltage remote control system for a fan motor, comprising a thermal relay having an input connected to a source of motor power and having closable high voltage contacts connected to apply said power to said motor, said relay further having a pair of selectable low voltage control inputs operable upon the momentary selective energization thereof to open and close said high voltage contacts, control means for said thermal relay including a timer, a cam in said timer, contact means in said timer controlled by said cam, means on said cam holding said contact means open during a timing period and closing said contact means near the end of said period followed by the opening of said contact means, and means connecting said timer contact means to said relay inputs for opening said high voltage contacts with the conclusion of said period.

5. A low voltage remote control system for an attic fan motor, comprising a thermal relay having an input connected to a source of motor power and having closable high voltage contacts connected to apply said power to said motor, said relay further having a pair of selectable low voltage control inputs operable upon the momentary selective energization thereof to open and close said high voltage contacts, first control means for said thermal relay including a single-pole, double-throw switch connected to said inputs for the selective energization thereof to start and stop said motor, and second control means including a timer, a cam in said timer, contact means in said timer controlled by said cam to close momentarily at the conclusion of a preselected timing period, and means connected to said low voltage contacts, first control means for said thermal relay inputs for opening said high voltage contacts at the conclusion of said period.

References Cited in the file of this patent

UNITED STATES PATENTS

| | | |
|---|---|---|
| 2,253,599 | Appleman et al. | Aug. 26, 1941 |
| 2,811,603 | Kock et al. | Oct. 29, 1957 |

UNITED STATES PATENT OFFICE
CERTIFICATE OF CORRECTION

Patent No. 3,096,468                                          July 2, 1963

Donald D. Kinsworthy

It is hereby certified that error appears in the above numbered patent requiring correction and that the said Letters Patent should read as corrected below.

Column 6, line 1, strike out "voltage contacts, first control means for said thermal relay" and insert instead -- necting said timer contact means to the one of said relay --.

Signed and sealed this 14th day of January 1964.

(SEAL)
Attest:

ERNEST W. SWIDER
Attesting Officer

EDWIN L. REYNOLDS

Acting Commissioner of Patents